United States Patent

[11] 3,618,811

| [72] | Inventor | Paul D. Martino<br>Mineral Wells, Tex. |
|---|---|---|
| [21] | Appl. No. | 857,790 |
| [22] | Filed | Sept. 15, 1969 |
| [45] | Patented | Nov. 9, 1971 |
| [73] | Assignee | Harsco Corporation<br>Harrisburg, Pa. |

[54] RELEASABLE FLUID SEAL OR TEST PLUG FOR CONDUITS
1 Claim, 4 Drawing Figs.

[52] U.S. Cl............................................ 220/24.5, 215/53
[51] Int. Cl............................................ B65d 39/12
[50] Field of Search................................ 215/53, 54; 220/24.5

[56] References Cited
UNITED STATES PATENTS

| 2,092,182 | 9/1937 | Ray | 220/24.5 |
| 2,773,619 | 12/1956 | Moeller | 220/24.5 |
| 3,054,427 | 9/1962 | Bonnette | 220/24.5 |
| 3,447,712 | 6/1969 | Galasso | 220/24.5 |
| 2,493,452 | 1/1950 | Grigg | 220/24.5 X |
| 2,652,943 | 9/1953 | Williams | 220/24.5 X |
| 2,685,380 | 8/1954 | Moeller | 220/24.5 X |
| 2,735,566 | 2/1956 | Bramming | 215/54 X |
| 2,800,242 | 7/1957 | Sauthoff | 220/24.5 X |

FOREIGN PATENTS

| 225,564 | 6/1962 | Austria | 215/52 |
| 545,645 | 3/1932 | Germany | 220/24.5 |

*Primary Examiner*—Joseph R. Leclair
*Assistant Examiner*—James R. Garrett
*Attorney*—Cameron, Kerkam & Sutton ABSTRACT: A releaseable fluid seal for conduits or pipes has a cylinder of an elastomeric resilient material fitting into the pipe or conduit. The cylinder has a conical internal surface. A truncated conical plate fits in the cylinder and a bolt extends from the plate through an open end of the cylinder. A second plate engages the periphery of the open end of the cylinder and also engages the end of the conduit or pipe or engages in the bell of the pipe. A wing nut on the bolt draws the two plates toward each other and bows the cylinder into fluidtight sealing engagement with the inner wall of the conduit or pipe. An externally threaded hollow tube passing through the conical plate may be used in place of the bolt when the seal is to be used as a test plug.

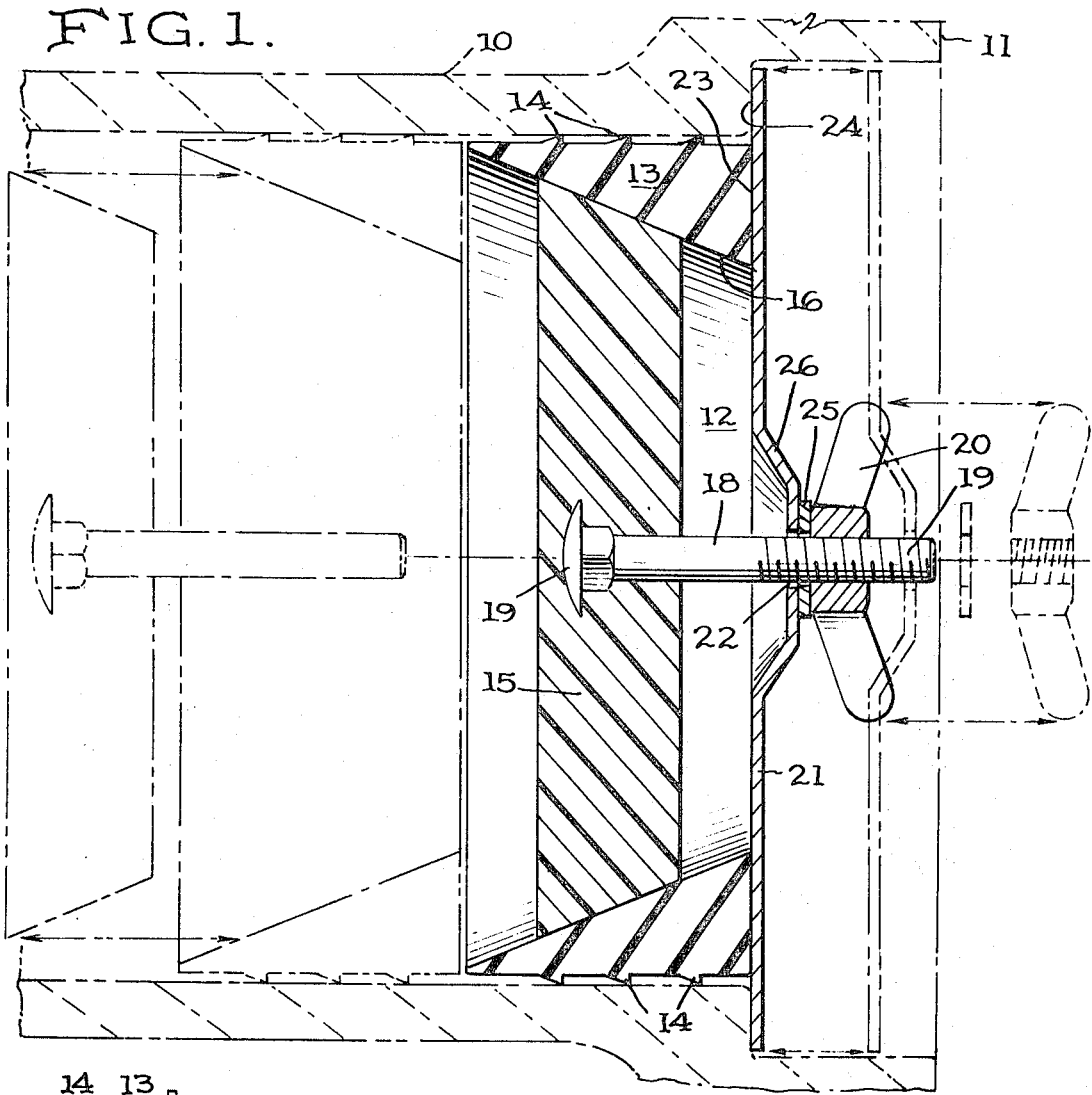
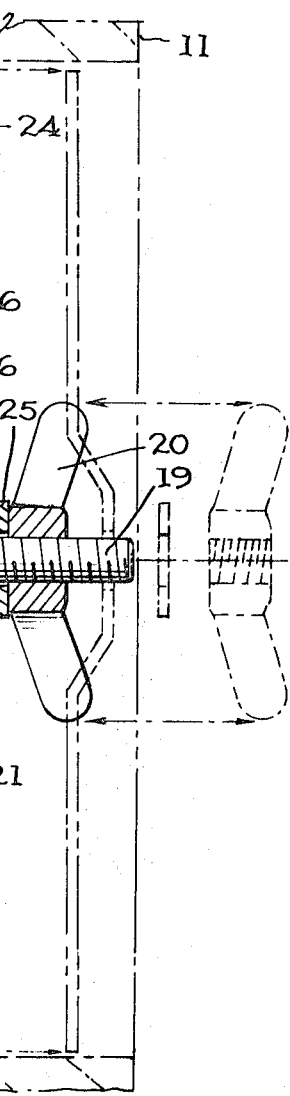
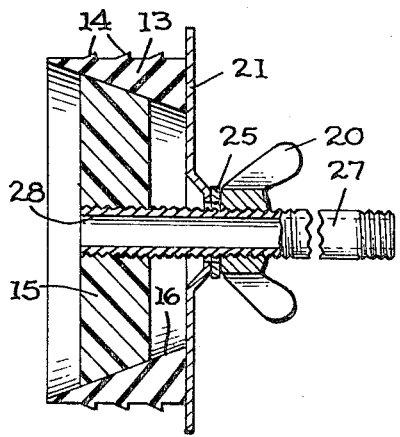
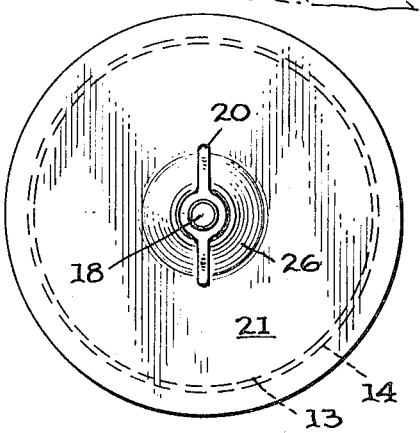
FIG. 1.
FIG. 2.
FIG. 3.
FIG. 4.
INVENTOR
PAUL D. MARTINO
BY Cameron, Kerkam & Sutton
ATTORNEYS

RELEASABLE FLUID SEAL OR TEST PLUG FOR CONDUITS

BACKGROUND OF THE INVENTION

This invention relates to releaseable sealing means or test plugs for conduits or pipes carrying fluid under pressure which seal is not subject to the corrosive action of the fluids and which may be used and reused, as desired, with ease of application and ease of removal. The surfaces of the seal or plug in engagement with the inner surface of the conduit or pipe are such that the seal may be used and reused without impairing the sealing action thereof.

The invention may be classified as pipes and tubular conduits with closures and plugs. In this highly developed art, patents such as U.S. Pat. Nos. 932,766; 1,809,613; and 3,156,373 relate in general to the same subject matter.

SUMMARY OF THE INVENTION

A releaseable sealing means in accordance with the invention comprises a cylindrically shaped closure member of resilient elastomeric material fitting into the internal bore of the pipe or conduit. The cylinder has a conical internal surface. A truncated conical plate is mounted in the cylinder and a bolt extends from the plate and is embedded in the bottom of the plate preventing leakage around the bolt. The bolt extends axially through the cylinder and through a second plate closing an open end of the cylinder. The second plate fits over the end of the pipe or conduit or fits in the bell of the pipe. A wingnut on the bolt draws the first plate toward the second plate and bows the cylinder into sealing engagement with the internal wall of the pipe or conduit. The external surface of the cylinder may be provided with circumferential integral fins for firm engagement of the cup with the interior surface of the conduit or pipe. When the seal is to be used as a test plug an externally threaded hollow tube passing through the first plate is used in place of the bolt.

BRIEF DESCRIPTION OF THE DRAWING

In the accompanying drawing, in which like reference characters indicate like parts, preferred embodiments of the present concept are shown and will be described hereinafter to illustrate the invention. In the drawing FIG. 1 is a cross-sectional view of a preferred embodiment of the seal of the present invention in place in the end of a pipe having a bell end;

FIG. 2 is a side elevation of the seal of FIG. 1;

FIG. 3 is a view of the seal as seen from the right in FIGS. 1 and 2; and

FIG. 4 is a cross-sectional view of another embodiment of the invention for use as a test plug.

DESCRIPTION OF THE PREFERRED EMBODIMENT

Referring now to the drawing, a pipe or conduit is generally indicated at 10 and is provided with a conventional bell end 11. The seal of the present invention is generally indicated at 12 and includes a cylinder 13 of suitable resilient elastomeric material such as vinyl plastisol, polyurethane or rubber having a diameter such that the sealing member 12 fits within pipe 10. Cylinder 13 may be provided with circumferential ribs 14 for engagement with the interior wall of the pipe or conduit 10.

As best illustrated in FIGS. 1, 2 and 4 the ribs 14 are shaped to provide a sawtooth configuration on the outer surface of cylindrical member 13. It should be readily apparent that the sawtooth shape of ribs 14 causes the outwardly directed sharp edge of each rib to lock into indentations in the inner wall of the conduit 10 and the thickened inner portion of ribs 14 provides cantilever action to prevent expulsion of the cylindrical member 13 by pressure within the conduit 10.

A truncated conical plate 15 of corrosive resistant material is mounted in conical internal surface 16 of cylinder 13. A bolt 18 is embedded in plate 15. Bolt 18 is provided with head 19 to engage in plate 15 and head 19 is so embedded in plate 15 as to prevent leakage of fluid around the bolt.

As best illustrated in FIG. 1, the internal surface 16 of cylinder 13 intersects the outer surface of cylinder 13 to form a sharp tapered edge on cylinder 13 which extends into pipe 10. It should be appreciated that such construction eliminates surfaces which extend perpendicular to the axis of pipe 10 such that pressure exerted by fluid in pipe 10 against the sleeve 13 urges the outer walls of the resilient cylinder 13 into engagement of the inner wall of pipe 10. It should also be appreciated that after an initial seal is established, by rotating wingnut 20, increased pressure in the pipe will act upon the tapered internal surfaces 16 of cylinder 13 and also upon plate 15 to increase gripping action between sawtooth-shaped ribs 14 and the walls of the pipe.

Bolt 18 is threaded at 19 to carry a suitable wingnut 20.

A dish-shaped plate 21 is provided with an aperture 22 through which bolt 18 passes. Plate 21 bears upon the circumferential top surface 23 of cylinder 13 and extends circumferentially from the outer surface of cylinder 13 to engage the offset 24 of bell 11. A washer 25 may be mounted between the cup of plate 21 on bolt 18 and wingnut 20.

When the seal 12 of the present concept is in place, as shown in FIG. 1, rotation of wingnut 20 draws plate 15 toward plate 21 and bows cylinder 13 and ribs 14 outwardly into sealing engagement with the interior surface of pipe or conduit 10.

The truncated conical surface of plate 15 slides on conical surface 16 of cylinder 13 to bow cylinder 13 into sealing engagement with the pipe or conduit.

Plate 21 is dish-shaped at 26 in proximity to bolt 18 to prevent plate 21 from bending inwardly, thus forcing cylinder 13 to bow and form a convex shape when wingnut 20 is tightened.

Plate 21 may be cadmium plated to resist corrosion, and plate 15 may be of any suitable rigid plastic material.

When the seal of the present invention is to be used as a test plug for bleeding air from the piping system or for introducing fluid under pressure into the piping system for test purposes, bolt 18 is replaced by a hollow threaded tube 27 (FIG. 4) threaded in and passing through plate 15 as at 28 with wingnut 20 mounted on the threads thereof adjacent plate 21. The embodiment of FIG. 4 is mounted in the pipe in the same manner as described above for the seal of FIG. 1.

What I claim is:

1. A releasable fluid seal for conduits comprising a hollow resilient cylinder of elastomeric material having a substantially uniform outside diameter fitting within the conduit; a plurality of spaced circumferential ribs of sawtooth-shaped radial cross section on the outer surface of said cylinder; a conical surface within said cylinder, said conical surface intersecting the outer surface of the cylinder to form a sharp edge at the base of the conical surface such that fluid pressure in the conduit urges sides of the cylinder toward the walls of the conduit; a truncated conical plate mounted in said cylinder engaging said conical surface, said truncated conical plate being constructed of corrosive resistant material; a threaded bolt having its head embedded in said truncated conical plate and extending axially through said cylinder; a plate having a central outwardly extending dish-shaped portion bearing on and closing an end of said cylinder and having a plannar annular rim thereon extending laterally outwardly therefrom for engaging the end of the conduit, said dish-shaped portion having an aperture formed centrally thereof through which said bolt extends; and threaded means on the threads of said bolt engaging the outer surface of said dish-shaped portion, whereby when said threaded means is rotated said truncated conical plate is drawn into said cylinder toward said dish-shaped portion and said cylinder is urged outwardly into sealing engagement with the conduit.

* * * * *